(12) United States Patent
Dimmick et al.

(10) Patent No.: US 10,552,834 B2
(45) Date of Patent: Feb. 4, 2020

(54) TOKENIZATION CAPABLE AUTHENTICATION FRAMEWORK

(71) Applicant: Visa International Service Association, San Francisco, CA (US)

(72) Inventors: James Dimmick, Foster City, CA (US); Shaw Li, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 1120 days.

(21) Appl. No.: 14/701,437

(22) Filed: Apr. 30, 2015

(65) Prior Publication Data

US 2016/0321652 A1    Nov. 3, 2016

(51) Int. Cl.
*G06Q 20/40* (2012.01)
*H04L 29/06* (2006.01)
*G06Q 20/38* (2012.01)

(52) U.S. Cl.
CPC ..... *G06Q 20/401* (2013.01); *G06Q 20/38215* (2013.01); *H04L 63/083* (2013.01); *G06Q 2220/00* (2013.01)

(58) Field of Classification Search
CPC .......... G06Q 20/401; G06Q 20/38215; G06Q 2220/00; G06Q 20/3674; H04L 63/083
(Continued)

(56) References Cited

U.S. PATENT DOCUMENTS 5,613,012 A    3/1997 Hoffman et al.
5,781,438 A    7/1998 Lee et al.
(Continued)

FOREIGN PATENT DOCUMENTS

EP    2156397 A1    2/2010
WO    2001035304 A1    5/2001
(Continued)

OTHER PUBLICATIONS

PCI DSS Tokenization Guidelines Information Supplement, Aug. 2011, (hereafter 'PCI'), https://www.pcisecuritystandards.org/documents/Tokenization_Guidelines_Info_Supplement.pdf, attached as PDF file), (Year: 2011).*

(Continued)

*Primary Examiner* — James D Nigh
*Assistant Examiner* — Margaret M Neubig
(74) *Attorney, Agent, or Firm* — Kilpatrick Townsend & Stockton LLP

(57) ABSTRACT

Embodiments are directed to systems and methods for performing consumer authentication in a tokenized transaction. The token in the authentication request may be resolved to corresponding credentials before the consumer authentication process is initiated. As part of an authentication system, the merchant computer may include a merchant plug-in module as a proxy between the merchant computer and an issuer access control server. The merchant plug-in module may communicate with the issuer access control server by sending verification and authentication messages to the issuer access control server via a directory server. The token may be resolved to corresponding credentials before the authentication request reaches the issuer access computer for authentication. The merchant plug-in module, the directory server or a token router coupled to the issuer access control server may each be in communication with one or more token service providers to de-tokenize the token provided by the consumer's user device.

18 Claims, 7 Drawing Sheets

(58) Field of Classification Search
USPC .................................................... 705/50–79
See application file for complete search history.

(56) References Cited

U.S. PATENT DOCUMENTS

| | | |
|---|---|---|
| 5,883,810 A | 3/1999 | Franklin et al. |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,227,447 B1 | 5/2001 | Campisano |
| 6,236,981 B1 | 5/2001 | Hill |
| 6,267,292 B1 | 7/2001 | Walker et al. |
| 6,327,578 B1 | 12/2001 | Linehan |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Newton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,171,525 B1 | 5/2012 | Pelly et al. |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,433,116 B2 | 9/2013 | Davis et al. |
| 8,533,860 B1 | 9/2013 | Grecia |
| 8,538,845 B2 | 9/2013 | Liberty |
| 8,555,079 B2 | 10/2013 | Shablygin et al. |

(56) References Cited

U.S. PATENT DOCUMENTS

| | | |
|---|---|---|
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | Von Behren et al. |
| 8,651,374 B2 | 2/2014 | Brabson et al. |
| 8,656,180 B2 | 2/2014 | Shablygin et al. |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1* | 7/2004 | Mascavage, III ...... G06Q 20/04 705/40 |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0015358 A1 | 1/2006 | Chua |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0201264 A1 | 8/2008 | Brown et al. |
| 2008/0201265 A1 | 8/2008 | Newton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |

(56) References Cited

U.S. PATENT DOCUMENTS

| | | |
|---|---|---|
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1* | 11/2012 | Bailey ................. H04L 9/0891 726/9 |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | Mccullagh et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder ("J.D."), II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1* | 9/2013 | Royyuru ............... G06Q 20/382 705/39 |
| 2013/0254117 A1 | 9/2013 | Von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |

(56) References Cited

U.S. PATENT DOCUMENTS

| | | |
|---|---|---|
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046327 A1 | 2/2015 | Taupitz |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0161608 A1* | 6/2015 | Gilbert ............... G06Q 20/4014 705/44 |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0224976 A1 | 8/2016 | Basu |
| 2017/0046696 A1 | 2/2017 | Powell et al. |
| 2017/0103387 A1 | 4/2017 | Weber |
| 2017/0220818 A1 | 8/2017 | Nagasundaram et al. |
| 2017/0228723 A1 | 8/2017 | Taylor |

FOREIGN PATENT DOCUMENTS

| | | |
|---|---|---|
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |
| WO | 2015054697 A1 | 4/2015 |

OTHER PUBLICATIONS

Verified by VISA, (hereafter VV, https://usa.visa.com/dam/VCOM/download/merchants/verified-by-visa-acquirer-merchant-implementation-guide.pdf, attached as PDF file), (Year: 2011).*

EMV Payment Tokenisation Specification, (hereafter "EMV", https://media.scmagazine.com/documents/95/emvco_payment_tokenisation_spe_23619.pdf, attached as PDF file). (Year: 2014).*

PCI DSS Tokenization Guidelines Information Supplement, Aug. 2011, (hereafter 'PCI'), https://www.pcisecuritystandards.org/documents/Tokenization_Guidelines_Info_Supplement.pdf, previously attached as PDF file), (Year: 2011).*

Verified by VISA, (hereafter VV, https://usa.visa.com/dam/VCOM/download/merchants/verified-by-visa-acquirer-merchant-implementation-guide.pdf, previously attached as PDF file), (Year: 2011).*

EMV Payment Tokenisation Specification, (hereafter "EMV", https://media.scmagazine.com/documents/95/emvco_payment_tokenisation_spe_23619.pdf, previously attached as PDF file). (Year: 2014).*

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

Wang, U.S. Appl. No. 62/000,288 (unpublished), Payment System Canonical Address Format filed May 19, 2014.

Sharma et al., U.S. Appl. No. 62/003,717 (unpublished), Mobile Merchant Application filed May 28, 2014.

Kalgi et al., U.S. Appl. No. 62/024,426, (unpublished) Secure Transactions Using Mobile Devices filed Jul. 14, 2014.

Prakash et al., U.S. Appl. No. 62/037,033 (unpublished), Sharing Payment Token filed Aug. 13, 2014.

Hoverson et al., U.S. Appl. No. 62/038,174 (unpublished), Customized Payment Gateway filed Aug. 15, 2014.

Wang, U.S. Appl. No. 62/042,050 (unpublished), Payment Device Authentication and Authorization System filed Aug. 26, 2014.

Gaddam et al., U.S. Appl. No. 62/053,736 (unpublished), Completing Transactions Without a User Payment Device filed Sep. 22, 2014.

Patterson, U.S. Appl. No. 62/054,346 (unpublished), Mirrored Token Vault filed Sep. 23, 2014.

Dimmick, U.S. Appl. No. 14/952,514 (unpublished), Systems Communications With Non-Sensitive Identifiers filed Nov. 25, 2015.

Dimmick, U.S. Appl. No. 14/952,444 (unpublished), Tokenization Request Via Access Device filed Nov. 25, 2015.

Prakash et al., U.S. Appl. No. 14/955,716 (unpublished), Provisioning Platform for Machine-To-Machine Devices filed Dec. 1, 2015.

Wong et al., U.S. Appl. No. 14/966,948 (unpublished), Automated Access Data Provisioning filed Dec. 11, 2015.

Stubbs et al., U.S. Appl. No. 62/103,522 (unpublished), Methods and Systems for Wallet Provider Provisioning filed Jan. 14, 2015.

McGuire, U.S. Appl. No. 14/600,523 (unpublished), Secure Payment Processing Using Authorization Request filed Jan. 20, 2015.

Flurscheim et al., U.S. Appl. No. 15/004,705 (unpublished), Cloud-Based Transactions With Magnetic Secure Transmission filed Jan. 22, 2016.

(56) References Cited

OTHER PUBLICATIONS

Flurscheim et al., U.S. Appl. No. 62/108,403 (unpublished), Wearables With NFC HCE filed Jan. 27, 2015.

Sabba et al., U.S. Appl. No. 15/011,366 (unpublished), Token Check Offline filed Jan. 29, 2016.

Patterson, U.S. Appl. No. 15/019,157 (unpublished), Token Processing Utilizing Multiple Authorizations filed Feb. 9, 2016.

Cash et al., U.S. Appl. No. 15/041,495 (unpublished), Peer Forward Authorization of Digital Requests filed Feb. 11, 2016.

Le Saint et al., U.S. Appl. No. 15/008,388 (unpublished), Methods for Secure Credential Provisioning filed Jan. 27, 2016.

Kinagi, U.S. Appl. No. 62/117,291 (unpublished), Token and Cryptogram Using Transaction Specific Information filed Feb. 17, 2015.

Galland et al. U.S. Appl. No. 62/128,709 (unpublished), Tokenizing Transaction Amounts filed Mar. 5, 2015.

Rangarajan et al., U.S. Appl. No. 61/751,763 (unpublished), Payments Bridge filed Jan. 11, 2013.

Li, U.S. Appl. No. 61/894,749 (unpublished), Methods and Systems for Authentication and Issuance of Tokens in a Secure Environment filed Oct. 23, 2013.

Aissi et al., U.S. Appl. No. 61/738,832 (unpublished), Management of Sensitive Data filed Dec. 18, 2012.

Wong et al., U.S. Appl. No. 61/879,362 (unpublished), Systems and Methods for Managing Mobile Cardholder Verification Methods filed Sep. 18, 2013.

Powell, U.S. Appl. No. 61/892,407 (unpublished), Issuer Over-The-Air Update Method and System filed Oct. 17, 2013.

Powell, U.S. Appl. No. 61/926,236 (unpublished), Methods and Systems for Provisioning Mobile Devices With Payment Credentials and Payment Token Identifiers filed Jan. 10, 2014.

Chipman, et al., U.S. Appl. No. 15/265,282 (Unpublished), Self-Cleaning Token Vault, filed Sep. 14, 2016.

Lopez, et al., U.S. Appl. No. 15/462,658 (Unpublished), Replacing Token on a Multi-Token User Device, filed Mar. 17, 2017.

International Search Report dated Jul. 18, 2016, PCT Application No. PCT/US2016/029586 (13 pages).

European Search Report dated Nov. 14, 2018 in Europe Application No. 16787076.5, 8 pages.

\* cited by examiner

TOKENIZATION CAPABLE AUTHENTICATION FRAMEWORK

BACKGROUND

The payments industry is evolving to support payment form factors that provide increased protection against counterfeit, account misuse, and other forms of fraud. While chip cards can provide substantial protection for card-present transactions, a similar need exists for further protections for card-not-present and hybrid transaction environments to minimize unauthorized use of account holder data and to prevent cross-channel fraud. Tokenization systems hold substantial promise to address these needs.

In a traditional electronic payment transaction, a consumer's primary account number (PAN) information is exposed to various entities involved during the transaction lifecycle. The PAN is passed from a merchant terminal, to an acquirer system, a payment processing network, payment gateways, etc.

Because the PAN can be exposed at various points in the transaction lifecycle, payment "tokens" have been developed to conduct payment transactions. A payment token serves as an additional security layer to the PAN and in effect becomes a proxy/surrogate to the PAN. Thus, the payment token may be used in place of PAN while initiating payment or submitting transactions. The use of payment tokens instead of PANs can reduce the risk of fraudulent activity since the real PAN is not exposed.

However, in the conventional tokenization systems, the issuer is not able to perform consumer authentication before the financial transaction begins. Consumer authentication is the process of verifying a consumer's ownership of an account. Accordingly, the issuer only confirms that the payment account provided to the issuer in a transaction request message can be used to conduct the transaction. The issuer is unable to confirm that the account is being used by the rightful owner or assignee. Thus, it is desirable to authenticate the consumer in a transaction (e.g. a tokenized transaction) before the transaction is authorized. This will benefit all payment system participants including consumers, merchants, and financial institutions. Authenticating consumers will reduce the levels of fraud, disputes, retrievals, and chargebacks, which subsequently will reduce the costs associated with each of these events.

Moreover, for tokenized transactions, the token(s) can be provided by a plurality of token service providers. Thus, it is desirable for an authentication entity performing consumer authentication to be able to work with a plurality of token service providers.

Embodiments of the invention address these and other problems, individually and collectively.

SUMMARY

Embodiments of the invention are directed to systems and methods related to performing consumer authentication in a tokenized transaction. According to various embodiments, the token in an authentication request message may be resolved to corresponding credentials before the consumer authentication process is initiated. In an exemplary embodiment, a consumer may provide a token to a merchant computer to conduct a transaction with the merchant using a user device. As part of an authentication system, the merchant computer may include a merchant plug-in module as a proxy between the merchant computer and an issuer access control server or other components within the system. The merchant plug-in module may communicate with the issuer access control server by sending verification and authentication messages to the issuer access control server via a directory server. It may be desirable to resolve the token before the authentication request reaches the issuer access computer for authentication. According to various embodiments, the merchant plug-in module, the directory server or a token router coupled to the issuer access control server may each be in communication with one or more token service providers to de-tokenize the token provided by the consumer or the consumer's user device.

In one embodiment, the present invention is directed to a method including receiving, by a first server computer transaction data. The first server computer may be a merchant plug-in module at a merchant computer, a directory server or a token router module coupled to (or integrated with) the issuer access control server. The method further includes determining, by the first server computer, that the transaction data includes a token and identifying, by the first server computer, a token service provider among a plurality of token service providers. The method also includes sending, by the first server computer, the token to the token service provider and receiving, by the first server computer, credentials associated with the token from the token service provider. The method includes forwarding, by the first server computer, the credentials to a second server computer for authentication. The second server computer may be the issuer access control server. The method also includes receiving, by the first server computer, the credentials and an authentication value from the second server computer upon the second server computer authenticating the credentials. For example, the authentication value may include cardholder authentication verification value. The authentication value is incorporated into a transaction authorization request message. In some embodiments, the first server computer may send the token and the authentication value to a third server computer for initiating a transaction authorization request using the token and the authentication value. For example, the third server computer may include a merchant server computer. The third server computer may generate the transaction authorization request message incorporating the token and the authentication value. In various embodiments, the transaction authorization request message may be de-tokenized using the token service provider and sent to an authorization computer for transaction authorization. The authorization computer may include an issuer computer.

In another embodiment, the present invention is directed to a server computer comprising a processor and a computer readable medium coupled to the processor, the computer readable medium comprising instructions for causing the processor to receive transaction data and determine that the transaction data includes a token. The computer readable medium further comprises instructions for causing the processor to identify a token service provider among a plurality of token service providers. The computer readable medium further comprises instructions for causing the processor to send the token to the token service provider and receive credentials associated with the token from the token service provider. The computer readable medium further comprises instructions for causing the processor to forward the credentials to a second server computer for authentication. The computer readable medium also comprises instructions for causing the processor to receive the credentials and an authentication value from the second server computer upon the second server computer authenticating the credentials, wherein the authentication value is incorporated into a transaction authorization request message.

In another embodiment, the present invention is directed to a system comprising a first server computer comprising a first processor and a first computer readable medium coupled to the first processor, and a second server computer comprising a second processor and a second computer readable medium coupled to the second processor. The first computer readable medium comprising instructions for causing the first processor to receive transaction data; determine that the transaction data includes a token; identify a token service provider among a plurality of token service providers; send the token to a token service provider; and receive credentials associated with the token from the token service provider. The second computer readable medium comprising instructions for causing the second processor to receive the credentials directly or indirectly from the first server computer for authentication; authenticate the credentials; generate an authentication value upon authenticating the credentials; and send the credentials and the authentication value to the first server computer. The credentials and the authentication value are incorporated into a modified transaction authorization request message.

In yet another embodiment, the present invention is directed to a method comprising receiving, by a first server computer transaction data. The first server computer may include a merchant plug-in module at a merchant computer, a directory server or a token router module coupled to (or integrated with) an issuer access control server. The method includes determining, by the first server, that the transaction data includes a token and identifying, by the first server computer, a token service provider among a plurality of token service providers. The method further includes sending, by the first server, the token to a token service provider; and receiving, by the first server, credentials associated with the token from the token service provider. The method also includes receiving, by a second server computer the credentials directly or indirectly from the first server computer for authentication. The second server computer may include the issuer access control server. The method further includes authenticating, by the second server computer, the credentials; and generating, by the second server computer, an authentication value upon authenticating the credentials. The method also includes sending, by the second server computer, the credentials and the authentication value to the first server computer, wherein the credentials and the authentication value are incorporated into a transaction authorization request message.

These and other embodiments of the invention are described in further detail below. Other objects and advantages of the present invention will be apparent to one of ordinary skill in the art upon review of the detailed description of the present invention and the included figures.

DETAILED DESCRIPTION

Figure 1A:
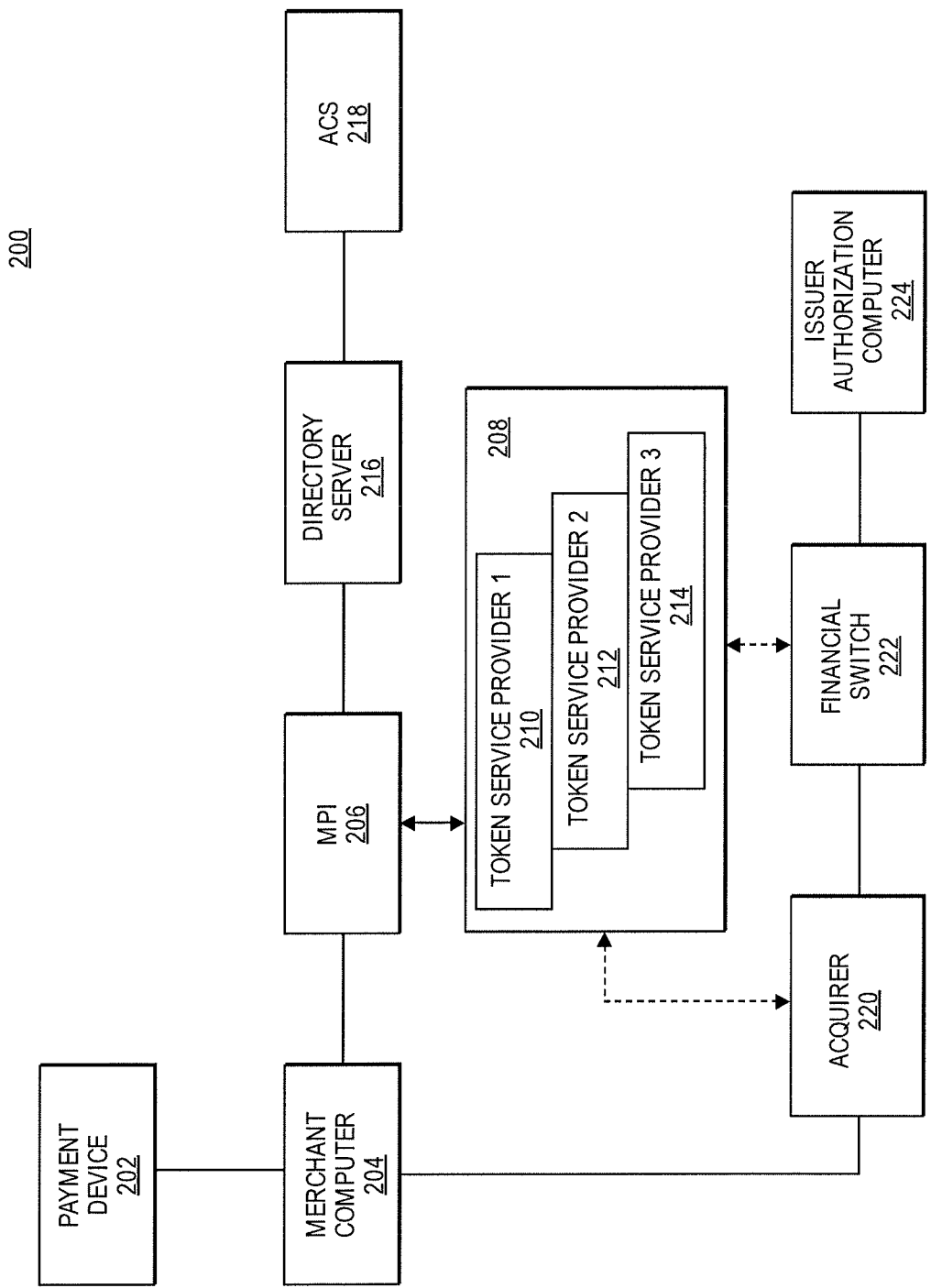
FIG. 1A shows a block diagram of a system resolving tokens in an authentication request message by a merchant plug-in prior to performing authentication according to an embodiment of the invention.

Embodiments of the present invention are directed to systems and methods related to performing consumer authentication in a tokenized transaction. According to various embodiments, the token in an authentication request may be resolved to corresponding credentials (e.g. a unique primary account number) before the consumer authentication process is initiated. In an exemplary embodiment, a consumer may provide a token to a merchant computer to conduct a transaction with the merchant using a user device. As part of an authentication system, in some embodiments, the merchant computer may include a merchant plug-in module as a proxy between the merchant computer and an issuer access control server or other components within the system. The merchant plug-in module may communicate with the issuer access control server by sending verification, enrollment request and authentication messages to the issuer access control server via a directory server. It may be desirable to resolve the token before the authentication request reaches the issuer access computer for authentication. According to various embodiments, the merchant plug-in module, the directory server or a token router coupled to (or integrated with) the issuer access control server may each be in communication with one or more token service providers to de-tokenize the token provided by the consumer or the consumer's user device.

Upon the consumer initiating a transaction request with the merchant, the merchant computer may generate an authentication request to authenticate the user. The authentication request may include transaction data provided by the consumer when a user device is presented/used for the transaction with the merchant. The transaction data may include a token, an account number (e.g. a primary account number (PAN)), user name, user billing address, etc. The merchant may forward the authentication request message to other servers in the system. Upon receipt of the authentication request message, the merchant plug-in module, the directory server or a token router may determine whether the authentication request message includes a token. If the authentication request message includes a token, the merchant plug-in module, the directory server or the token router may determine a token service provider among a plurality of token service providers that issued and/or manages the token in the authentication request message. The merchant plug-in module, the directory server or the token router may interact with the identified token service provider to de-tokenize the token (i.e. to resolve the token to the corresponding credentials, such as an account number). The authentication request message may be modified by the merchant plug-in module, the directory server or the token router before being forwarded to the issuer access server computer. The issuer access server computer may perform consumer authentication using the data in the authentication request message and may generate an authentication response message indicating whether the consumer is authenticated.

The authentication response message may be forwarded from the issuer access control server to the merchant computer after being routed through one or more of the merchant plug-in module, the directory server and the token router. According to various embodiments, before sending the authentication response message to the merchant computer, the merchant plug-in module, the directory server or the token router may re-tokenize the credentials (e.g. the account number) provided in the authentication response message using the identified token service provider. Upon receipt of the authentication response message, the merchant computer may initiate a transaction request message to perform the transaction requested by now-authenticated consumer.

Before discussing specific embodiments and examples, some descriptions of terms used herein are provided below.

A "token" may include an identifier for a payment account that is a substitute for an account identifier, such as a primary account number (PAN). For example, a token may include a series of numeric and/or alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "token service provider" may refer to an entity including one or more server computers that generates, processes and maintains tokens. The token service provider may include or be in communication with a token vault where the generated tokens are stored. Specifically, the token vault may maintain one-to-one mapping between a token and a primary account number (PAN) represented by the token.

A "token vault" may refer to a repository that maintains established token-to-PAN mappings. According to various embodiments, the token vault may also maintain other attributes of a token requestor that may be determined at the time of registration and that may be used by the token service provider to apply domain restrictions or other controls during transaction processing. In some embodiments, the token vault may be provided as a part of the token service provider. Alternatively, the token vault may be a remote repository accessible by the token service provider. The token vault, due to the sensitive nature of the data mappings that are stored and managed in it, may be protected by strong underlying physical and logical security.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other-information which may be replaced with a substitute value (i.e., token). Tokenization may be used to enhance transaction efficiency, improve transaction security, increase service transparency, or to provide a method for third-party enablement.

"Token exchange" or "de-tokenization" is a process of restoring the data that was substituted during tokenization. For example, a token exchange may include replacing a payment token with a corresponding primary account number (PAN) that was associated with the payment token during tokenization of the PAN. Thus, the de-tokenization may refer to the process of redeeming a token for the associated PAN value based on a token-to-PAN mapping stored, for example, in a token vault. The ability to retrieve a PAN in exchange for the associated token may be restricted to specifically authorized entities, individuals, applications, or systems. Further, de-tokenization or token exchange may be applied to any other information. In some embodiments, token exchange may be achieved via a transactional message, such as an ISO message, an application programming interface (API), or another type of web interface (e.g., web request).

A "merchant computer" or "merchant server computer" may refer to one or more computer servers used by a merchant to conduct payment transactions. For example, the merchant computer may be used to provide an online storefront for consumers to shop and also to conduct online transactions with consumers once the consumers have decided to purchase goods from the merchant. The merchant computer may include or may be in communication with an access device.

An "access device" may be any suitable device for accessing a remote computer. In some embodiments of the invention, an access device may communicate with a merchant computer or a payment processing network, and may interact with a portable device, a user computer apparatus, and/or a user mobile device. An access device may generally be located in any suitable location, such as at the location of a merchant. An access device may be in any suitable form. Some examples of access devices include point of sale (POS) devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable device.

A "merchant plug-in" (or "MPI") may refer to a proxy provided between the merchant computer and other computer servers in a payment system. For example, the merchant plug-in may be a component that performs various authentication functions on behalf of the merchant. The merchant plug-in may be embodied by suitable hardware and/or software that are accessible to a merchant. For example, the merchant plug-in may be software running on the merchant server or it may be a component run on a different server accessible by the merchant. The merchant plug-in may be able to perform functions such as determining whether authentication is available for a card number, validating a digital signature in an authentication message, tokenization of payment data, detokenization of tokens, and other functions.

An "access control server" (or "ACS") may refer to a server computer that provides issuers, or other entities capable of authenticating a consumer conducting an online transaction, with the ability to authenticate consumers during a transaction. An access control server performs the requested authentication services and provides digitally signed responses to entities requesting authentication. An access control server may be shared by multiple parties. Alternatively, a party may have multiple access control servers, each associated with a different subset of the consumers.

A "directory server" may refer to a server computer that can be used to route messages in a payment system. The messages routed by the directory server may contain enrolment and authentication information between a merchant plug-in (MPI) and issuer access control server. The directory server can also determine whether a consumer can utilize the authentication services. In some embodiments, the directory server can be operated by a service organization such as Visa. According to various embodiments, the directory server may tokenize payment data or may detokenize tokens.

A "user device" may refer to any device that may be used to conduct a financial transaction, such as to provide payment information to a merchant. A user device may be in any suitable form. For example, suitable user devices may be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. Other examples of user devices include cellular phones, personal digital assistants (PDAs), pagers, payment cards, security cards, access cards, smart media, transponders, 2-D barcodes, an electronic or digital wallet, wearable devices such as smart watches, fitness bands, ankle bracelets, rings, earrings, and the like. If the user device is in the form of a debit, credit, or smartcard, the user device may also optionally have features such as magnetic stripes. Such devices can operate in either a contact or contactless mode. In some embodiments, the user device may include a mobile device comprising any electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. In some embodiments, the user device may include a stand-alone computer for conducting e-commerce transactions. Yet it other embodiments, the user device may include a vehicle, such as a car or a motorcycle having a processor and a memory storing payment information of the user.

An "authorization computer" may be a computer that is programmed to determine whether or not transactions can be authorized. An authorization computer may be programmed to perform various checks including fraud checks, account balance checks, etc.

An "issuer" may typically refer to a business entity (e.g., a bank) that maintains financial accounts for a user and often issues a credit or debit card to the user. An issuer can include a payment account issuer. The issuer may be responsible to make a credit limit available to account holders and may also be responsible for sending payments to merchants for purchases made with payment accounts issued by the issuer. The issuer may authorize a requested load amount to be uploaded to a user device. The issuer may operate an "authorization computer" to perform the foregoing actions.

A "payment account" or a "financial account" (which may be associated with one or more portable devices) may include any suitable payment account including a credit card account, a checking account, a savings account, a merchant account assigned to a accountholder, or a prepaid account.

A "server computer" or a "server" can be a powerful computer or a cluster of computers. For example, the server computer can be a large mainframe, a minicomputer cluster, or a group of servers functioning as a unit. In one example, the server computer may be a database server coupled to a Web server.

A "payment processor" may refer to an electronic payment system used to accept, transmit, or process transactions made by user devices for money, goods, or services. The payment processor may transfer information and funds among issuers, acquirers, merchants, and user device users.

A "transaction authorization request message" may be an electronic message that is transmitted to an authorization computer and requests authorization for a transaction. In some embodiments, a transaction authorization request message is sent to a payment processing network and/or an issuer (i.e., an issuer computer) of a payment account to request authorization for a payment transaction. A transaction authorization request message according to some embodiments may comply with ISO 8583, which is a standard for systems that exchange electronic transaction information associated with a payment made by a consumer using a user device or a payment account.

A "transaction authorization response message" may be an electronic message reply to a transaction authorization request message. It may be generated by an issuing financial institution (i.e. using an issuer computer) or a payment processing network. The transaction authorization response message may include an authorization code, which may be a code that an account issuing bank returns in response to an transaction request message in an electronic message (either directly or through the payment processing network) to the merchant's access device (e.g. POS terminal) that indicates approval of the transaction. The code may serve as proof of authorization. In some embodiments, the transaction authorization response message may include a script that, when received at the acquirer device, may cause/enable the acquirer device to load a required load amount on to the portable device. In other embodiments, the transaction authorization response message may include a script that can be used by a processor of the portable device to load a required load amount on to memory chip of the portable device.

An "authentication request message" may be an electronic message that is transmitted to an authentication server such as an issuer access control server (ACS) and requests authentication for a consumer. The data sent in the authentication request message may include consumer computing device data (e.g., operating system data, browser data, mobile application data, geo-location data), consumer data (e.g., user name, user address data, user email address, user phone number), and transaction data (e.g., shopping cart data, user device data, payment account number, token), and/or other comparable data. In some embodiments, while some elements in the authentication request message are tokenized, the other elements may be in plain text (e.g. not tokenized).

An "authentication response message" may be an electronic message reply to an authentication request message. It may be generated by an authentication computer at an issuing financial institution (i.e. using an issuer access control server (ACS)). The authentication response message may include an authentication value, which may be a code that an account issuing bank returns in response to an authentication request message in an electronic message (either directly or through a directory server) to the merchant computer or merchant plug-in (MPI) that indicates authentication of the consumer (i.e. whether the consumer is the rightful owner or assignee of the payment account identified in the authentication request message). The code may serve as proof of authentication. Alternatively, the authentication response message can include data indicating that the authentication process failed. In some embodiments, the authentication response message may include an error code identifying the reason for failure of the authentication process.

Embodiments of the present invention may be used to provide tokenization capability in a consumer authentication process. Embodiments may receive an account number from a user device at a merchant computer, initiate a consumer authentication process, subsequently tokenize the account number and return an authentication value along with the token to the merchant computer. Alternatively, embodiments may receive a token from a user device at a merchant computer, detokenize the token to obtain the account number represented by the token, initiate a consumer authentication process, subsequently re-tokenize the account number and return the authentication value along with the token to the merchant computer. The detokenization and/or the re-tokenization may be done by a merchant plug-in (MPI), a directory server or a token router coupled to an issuer access control server (ACS). The MPI, the directory server and the token router may communicate with a plurality of token service providers to detokenize the tokens provided in authentication request messages or to re-tokenize the credentials provided in authentication response messages.

FIG. 1A shows a block diagram of a system 200 resolving tokens in an authentication request message by a merchant plug-in prior to performing authentication according to an embodiment of the invention. The system 200 includes a consumer user device 202, a merchant computer 204, a merchant plug-in (MPI) module 206, a tokenization service environment 208 including a plurality of token service providers (e.g. a first token service provider 210, a second token service provider 212 and a third token service provider 214), a directory server 216 and an issuer access control server ("ACS") 218. For simplicity of illustration, a certain number of components are shown in FIG. 1A. It is understood, however, that embodiments of the invention may include more than one of each component. In addition, some embodiments of the invention may include fewer than or greater than all of the components shown in FIG. 1A. In addition, the components in FIG. 1A may communicate via any suitable communication medium (including the internet), using any suitable communications protocol.

The consumer user device 202 may be associated with a consumer. The consumer (e.g. user) may be any individual or business using the consumer user device 202 to conduct a transaction with a merchant. The consumer user device 202 may be configured to send transaction data as part of a transaction. The transaction data may include computing device data, user device data, geolocation data, consumer address, consumer email address, consumer phone number, transaction amount, account data (e.g. account number or token), merchant data, or other comparable data. In some embodiments, the consumer user device 202 may provide the transaction data upon request from another entity, such as the merchant computer 204. For example, the transaction data may be obtained via a shopping cart for a merchant. In some embodiments, the consumer user device 202 may be configured to send the transaction data automatically as part of conducting a transaction.

The merchant computer 204 may include any suitable computational apparatus operated by a merchant. Examples of merchant computers 204 may include an access device or an Internet merchant computer. In some embodiments, the merchant computer 204 may include a web server computer that may host a plurality of websites that are established for one or more countries. In some embodiments, the merchant computer 204 may be configured to send data as part of a payment verification and authentication process for a transaction between the consumer and the merchant. The merchant computer 204 may also be configured to generate authentication request messages for transactions between the merchant and consumer, and route the authentication request messages to an issuer access control server 218 for additional transaction processing. The authentication request messages sent by the merchant computer 204 may be sent by the merchant plug-in module 206.

The merchant plug-in (MPI) module 206 may be a proxy between the merchant computer 204 and the issuer access control server 218 or other components within the system 200 (e.g. the directory server 216). The merchant plug-in module 206 may be in communication with a tokenization environment 208 including a plurality of token service providers, such as a first token service provider 210, a second token service provider 212 and a third token service provider 214. When the merchant plug-in module 206 determines that the data received from the consumer user device 202 or the authentication request message generated by the merchant computer 204 includes a token, the merchant plug-in module 206 may identify the token service provider among the plurality of token service providers as the issuer/manager of the token. The merchant plug-in module 206 may interact with the identified token service provider to detokenize the token, i.e. to retrieve credentials (e.g. the account number) corresponding to the token. The merchant plug-in module 206 may then modify the authentication request message generated by the merchant computer 204 to replace the token with the retrieved credentials.

The merchant plug-in module 206 may communicate with the issuer access control server 218 by sending the modified authentication message to the issuer access control server 218 via the directory server 216.

The directory server 216 may be a server computer configured to route messages from the merchant plug-in module 206 to the issuer access control server computer 218, as well as messages back from the issuer access control server 218 to the merchant plug-in module 206. In other embodiments, the directory server 216 may route authentication request and response messages between the merchant computer 204 and the issuer access control server 218 as part of a transaction. In some embodiments, the directory server computer 216 may be operated by a payment processing network.

The issuer access control server 218 may comprise a server computer that may be configured to conduct authentication and authorization processes. The issuer access control server 218 may be associated with an issuer, which can be any bank that issues and maintains a financial account for the consumer. The issuer access control server 218 may validate (or authenticate) the PAN or an account associated with the consumer. The issuer access control server 218 may use the PAN, computing device data, user device data, geolocation data, consumer data, transaction data, account data, or other comparable data, in order to authenticate the consumer and PAN. When the issuer access control server 218 performs user authentication, the issuer access control server 218 may provide a digitally signed authentication response message to the merchant computer 204 through the directory server 216. In other embodiments, the issuer access control server 218 may send the authentication response message back to a consumer user device 202 directly. The authentication response message may include at least the credentials and an authentication value, such as a cardholder/consumer authentication verification value (CAVV), indicating the authentication results.

In some embodiments, the issuer access control server 218 may communicate with an authentication history server. The authentication history server may be a database connected to the issuer access control server 218 that can be accessed as part of the authentication process. For example, the authentication history server may store user authentication data associated with user device or primary account numbers ("PAN"). The authentication history server may further store computing device authentication for consumers enrolled in account authentication services. The issuer access control server 218 may query the authentication history server to access and use the previously performed authentication results.

In some embodiments, the issuer access control server 218 may conduct a risk analysis based on the data received from the consumer user device 202. As noted above, the data may include computing device data, user device data, geolocation data, consumer data, transaction data, account data, or other comparable data. The issuer access control server 218 may use this data to determine a risk associated with the user device 202 or payment account that is being used for the transaction. The issuer access control server 218 may query third party sources in order to retrieve additional data for performing the risk analysis. In other embodiments, the third party sources may conduct the risk analysis and send the risk analysis to the issuer access control server 218.

The authentication response message generated by the issuer access control server 218 may be based on the risk analysis conducted by the issuer access control server 218. The authentication response message may provide an indication to the merchant computer 204 that the consumer has been authenticated, not authenticated, or that authentication processes should be "stepped up" (e.g., the issuer access control server 218 is not sure whether the rightful consumer is conducting the transaction). In such cases, the issuer access control server 218 may suggest that further authentication processes should be performed.

The issuer access control server 218 may have pre-defined or user-defined risk thresholds. When the risk level is below the risk threshold, the issuer access control server 218 may provide an indication that the consumer and user device are authenticated and that the transaction may proceed. When the risk level is above the risk thresholds, the issuer access control server 218 may provide an indication that the consumer and user device are not authenticated and that the transaction should not proceed. In other embodiments, the issuer access control server 218 may determine that it has insufficient data to make a decision and may indicate that stepped-up authentication processes should be conducted (e.g., challenge question or password request). In such embodiments, the stepped-up authentication may be performed by the issuer access control server 218, or by another entity, such as the merchant computer 204.

The authentication response message generated by the issuer access server computer 218 may be sent to the merchant plug-in module 206 via the directory server 216. The authentication response message may include the credentials retrieved by the merchant plug-in module 206 from the identified token service provider. Before forwarding the authentication response message to the merchant computer 204, the merchant plug-in module 206 may communicate with the identified token service provider to re-tokenize the credentials, e.g. the merchant plug-in module 206 may send the account number to the token service provider and obtain the token corresponding to the account number. In some embodiments, the merchant plug-in module 206 may store the token and/or the mapping between the token and the credentials. In such embodiments, the merchant plug-in module 206 may re-tokenize the credentials without communicating with the token service provider. The merchant plug-in module 206 may then modify the authentication response message to replace the credentials with the token. The modified authentication response message may include, at least, the token and the authentication value.

If the authentication response message indicates that the consumer has been authenticated by the issuer's access control server 218, the merchant computer 204 may start the transaction by generating a transaction request message. The transaction request message may include a token along with other transaction and/or consumer identifying data. The transaction request message may be for conducting a payment transaction using the primary account number represented by the token included in the transaction request message. The merchant computer 204 may route the transaction request message to an issuer authorization computer 224 for additional transaction processing. The merchant computer 204 may send the transaction request message to an acquirer computer 220, which then forwards the transaction request message to a financial switch 222. The financial switch 222 may be a payment processor (e.g. a payment processing network). The acquirer 202 or the financial switch 222 may identify the token service provider that issued and/or manages the token. The acquirer 202 or the financial switch 222 may then interact with the identified token provider to detokenize the token (i.e. send the token to the token service provider and receive the account number represented by the token). The acquirer 202 or the financial switch 222 may modify the transaction request message to replace the token with the corresponding account number. The modified transaction request message may be sent to an issuer authorization computer 224 for authorization.

The issuer authorization computer 224 may authorize or deny the transaction. The issuer authorization computer 224 may generate a transaction response message indicating whether the transaction is authorized or denied. The issuer authorization computer 224 may send the transaction response message to the merchant computer 204 via the financial switch 222 and the acquirer 220. The transaction response message may include at least the account number and an indicator indicating whether the transaction has been authorized or denied. The financial switch 222 or the acquirer 220 may re-tokenize the account number (i.e. send the account number to the token service provider and receive the token representing the account number). The acquirer 202 or the financial switch 222 may modify the transaction request message to replace the account number with the received token before forwarding the transaction response message to the merchant computer 204.

According to various embodiments, the directory server 216 and the financial switch 222 may be the same entity or may be managed by the same entity, such as a payment processing network. In some embodiments, the issuer's access server computer 218 and the issuer authorization computer 224 may be same device or may be part of a same cluster of computers.

Figure 1B:
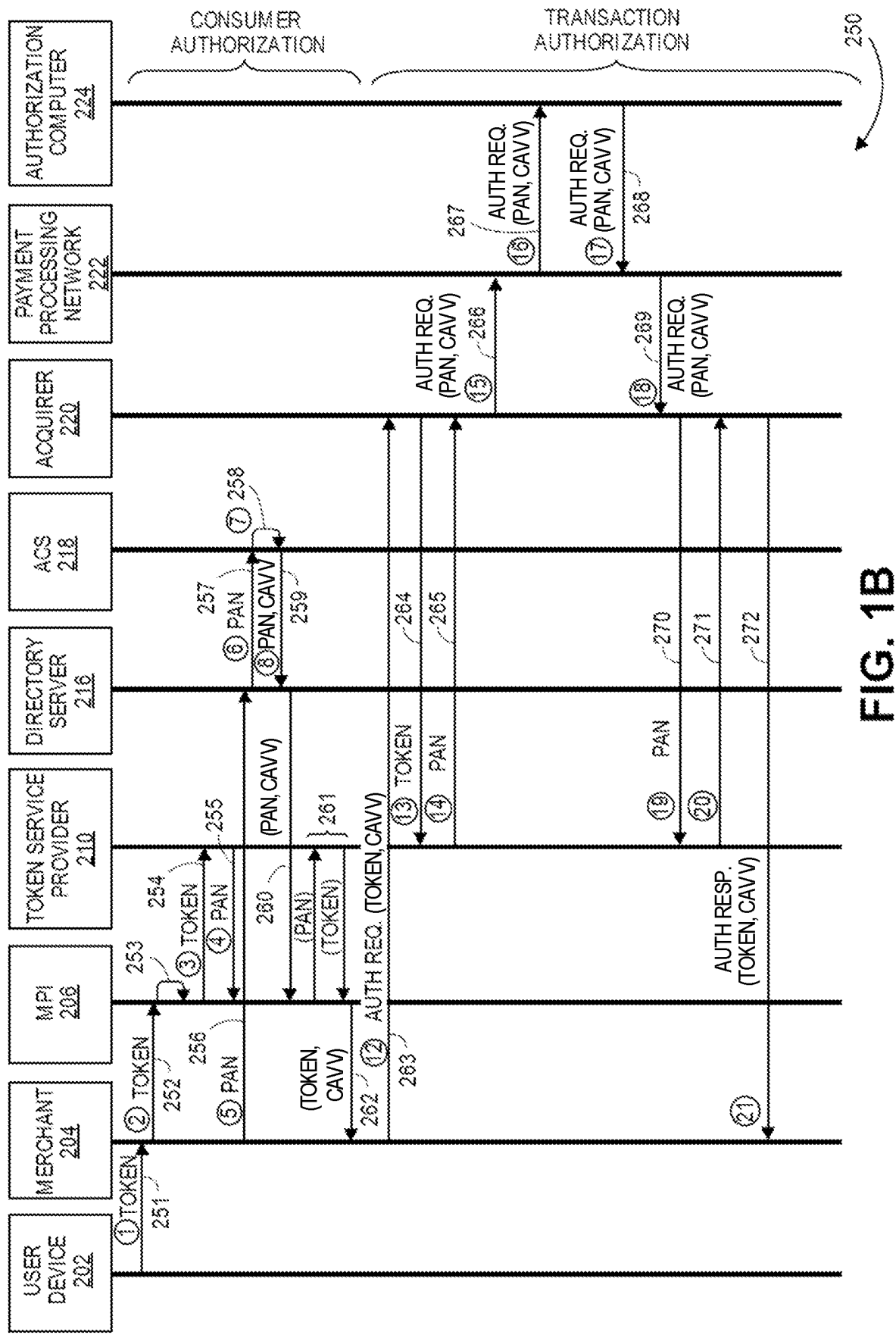
FIG. 1B shows a flowchart of steps for resolving tokens in an authentication request message by a merchant plug-in prior to performing authentication according to an embodiment of the invention.

FIG. 1B shows a flowchart of steps for resolving tokens in an authentication request message by a merchant plug-in prior to performing authentication according to an embodiment of the invention. Additional methods and processes may be included within these methods and may be recognized by one of ordinary skill in the art, in light of the description below. Further, in some embodiments of the present invention, the described methods may be combined, mixed, and matched, as one of ordinary skill would recognize.

At step 251, the consumer provides data, such as transaction data, identification data, payment data, and the like to the merchant device 204 using the user device 202. The data may include a token representing an account number issued to the consumer by an issuer of consumer's payment account. The merchant computer 204 may generate an authentication request message to be forwarded to an issuer access control server 218 in order to authenticate that the consumer is the rightful owner or assignee of a payment account associated with the data transmitted by the consumer. At step 252, the merchant computer 204 may send the authentication request message including at least the token to a merchant plug-in module 206.

At step 253, the merchant plug-in module 206 may analyze the authentication request message and determine that the message includes a token. For example, the merchant plug-in module 206 may parse the authentication request message and determine that data provided in a first field, such as the account data field, has a special format. According to various embodiments, the token may have a format that conforms to an industry standard. For example, the token may start, end or contain one or more specific characters. In some embodiments, the token may consist of truncated account number (e.g. first 6 digits and last 4 digits of the account number are retained) with alphabetic and numeric characters replacing middle digits.

Upon determining that the authentication request message includes a token, the merchant plug-in module 206 may determine a token service provider 210 among the plurality of token service providers as the issuer and/or manager of the token. For example, the merchant plug-in module 206 may determine the token service provider 210 based on analyzing a format of the token. The format of the token may include a series of predetermined characters that are assigned to a specific token service provider. The merchant plug-in module 206 may have access to a table or database storing the correspondence between the token service providers and predetermined format used by the token service providers. The merchant plug-in module 206 may interact with the identified token service provider 210 to de-tokenize the token in the authentication request message. In some embodiments, the merchant plug-in 206 may store the token.

At step 254, the merchant plug-in module 206 may send the token to the token service provider 210. The token service provider 210 may interact with a token vault where tokens and corresponding account numbers are stored. For example, the tokens and corresponding account numbers may be stored in forms of tables or in databases. The token service provider 210 may query the token vault (e.g. the tables or the databases) and retrieve the account number (e.g. a primary account number (PAN)) corresponding to the token. At step 255, the token service provider 210 may send the account number represented by the token to the merchant plug-in module 206. The merchant plug-in module 206 may modify the authentication request message to replace the token with the corresponding account number. Alternatively, the merchant plug-in module 206 may send the received account number to the merchant computer 204 so that the merchant computer may modify the authentication request message to replace the token with the corresponding account number. At step 256, the modified authentication request message including at least the account number may be sent to a directory server 216.

At step 257, the directory server may identify the issuer access control server 218 based on the account number and send the modified authentication request message to the issuer access control server 218 for authentication. For example, the directory server 216 may parse the modified authentication request message to identify the account number provided in a predetermined field of the modified authentication request message. Based on the format of the account number, the directory server may query a table or a database to identify the issuer access control server for the issuer that may have generated and/or manage the account number.

In some embodiments, the consumer data provided to the merchant at step 251 may include the account number instead of the token. In such embodiments, the merchant computer 204 or the merchant plug-in module 206 may generate the authentication request message including at least the account number without interacting with the token service provider 210. The authentication request message may be sent to the access control server 218 via the directory server 216 for authentication.

At step 258, the issuer access control server may perform authentication using the data in the modified authentication request message to determine whether the user is the rightful owner or assignee of the indicated account number. In some embodiments, the issuer access control server 218 may interact with the consumer so that the consumer may authenticate his or her identity by presenting authentication information to the access control server 218. In some embodiments, the consumer authenticates his or her identity by providing a password, credential, or other identifying information previously associated with their account.

For example, the access control server may generate an authentication message for the consumer. The authentication message may be sent to a consumer's user device. The authentication message may cause the consumer's user device to display an "authentication challenge" user interface, and thus the consumer may be authenticated using processes applicable to the account number (e.g., password, PIN entry, etc.). The consumer's user device may send a reply message including consumer's response to the authentication challenge (e.g. a password) to the access control server. The access control server may determine whether the provided password is correct.

At step 258, upon authenticating the consumer, the access control server 218 generates an authentication response message including at least the account number and an authentication value indicating whether the consumer has been authenticated by the access server computer 218. If the authentication information provided by the consumer matches the authentication information previously associated with the account being used for the proposed transaction, then the authentication response message may include data indicating that the authentication process was successful. Alternatively, the authentication response message can include data indicating that the authentication process failed. In some embodiments, the authentication response message may include an error code identifying the reason for failure of the authentication process.

At step 259, the access control server 218 sends the authentication response message including the account number and the authentication value to the directory server 216. The directory server 216 sends the authentication response message to the merchant plug-in module 206 at step 260. The merchant plug-in module 206 may re-tokenize the account number included in the authentication response message by interacting with the token service provider 210. In some embodiments, the merchant plug-in module 206 may store the token and/or the mapping between the token and the credentials. In such embodiments, the merchant plug-in module 206 may re-tokenize the credentials without communicating with the token service provider. At step 261, the merchant plug-in module 206 may send the account number to the token service provider 210 and receive the corresponding token from the token service provider 210. The merchant plug-in module 206 may modify the authentication response message to replace the account number with the retrieved token. At step 262, the merchant plug-in module 206 may send the modified authentication response message including at least the token and the authentication value to the merchant computer 204.

If the consumer has been authenticated by the access control server 218 (i.e. the authentication value included in the authentication response message indicates that the consumer has been authenticated by the access control server), the merchant computer 204 may start the payment transaction by generating a transaction authorization request message including at least the authentication value and the token. The transaction authorization request message may also include the transaction amount, user identifying information, merchant identifying information, etc.

At step 263, the merchant computer 204 may send the transaction authorization request message including the token and the authentication value to the acquirer 220. The acquirer 220 may send the transaction authorization request message to an authorization computer 224 via a payment processing network 222. Prior to sending the transaction authorization request message to the authorization computer 224, the acquirer 220 or the payment processing network 222 may detokenize the token. FIG. 1B illustrates an exemplary embodiment where the acquirer 220 interacts with the token service provider 210 to detokenize the token. In other embodiments, the payment processing network 222 may interact with the token service provider 210 to detokenize the token.

At step 264, the acquirer may send the token to the token service provider 210. At step 265, the token service provider 210 may send the account number associated with the token to the acquirer 220. The acquirer 220 may modify the transaction authorization request message to replace the token with the corresponding account number and send the modified transaction authorization request message to the payment processing network at step 266. At step 267, the payment processing network may send the modified transaction authorization request message to the authorization computer 224 for authorization.

The authorization computer 224, may process the modified transaction authorization request message and generate a transaction authorization response message. The transaction authorization response message may include at least the account number and an indication of whether the transaction has been authorized. At step 268, the authorization computer 224 may send the transaction authorization response message to the payment processing network 222. At step 269, the payment processing network 222 may forward the transaction authorization response message to the acquirer 220. The acquirer 220 may interact with the token service provider 210 to re-tokenize the transaction authorization response message (steps 270 and 271). Upon receiving the token from the token service provider 210, the acquirer 220 may modify the transaction authorization response message to replace the account number with the token. At step 272, the acquirer 220 may send the modified transaction authorization response message to the merchant 204 informing the merchant 204 whether the transaction has been authorized by the authorization computer 224.

The system and the flowchart discussed above in connection with FIGS. 1A-1B allow resolving tokens provided by the consumer prior to performing a consumer authentication. The merchant plug-in module illustrated in FIGS. 1A-1B may perform consumer authentication and tokenization functions in a combined manner. The merchant plug-in module is capable of determining if the authentication request message received from the merchant computer includes a token. If the authentication request message includes a token, the merchant plug-in module identifies a token provider associated with the token and interacts with the identified token provider to detokenize the token (e.g. receive an account number associated with the token). Upon communicating with an access control server via a directory server to authenticate the consumer, the merchant plug-in module may re-tokenize the account number when the authentication is complete.

A tokenization/detokenization merchant plug-in module requires very limited or no changes to be implemented in the transaction ecosystem. That is, the issuer and the payment processing network do not need to be modified to work with tokens. In addition, allowing merchant plug-in modules to detokenize tokens may require the merchants to comply with various industry standards. That, in return, would bring increased levels of security at the merchant level.

The merchant plug-in module may not be the only component in the system that is capable of interacting with token service providers. For example, the directory server may interact with a tokenization environment including a plurality of token service providers, as illustrated in FIG. 2A.

Figure 2A:
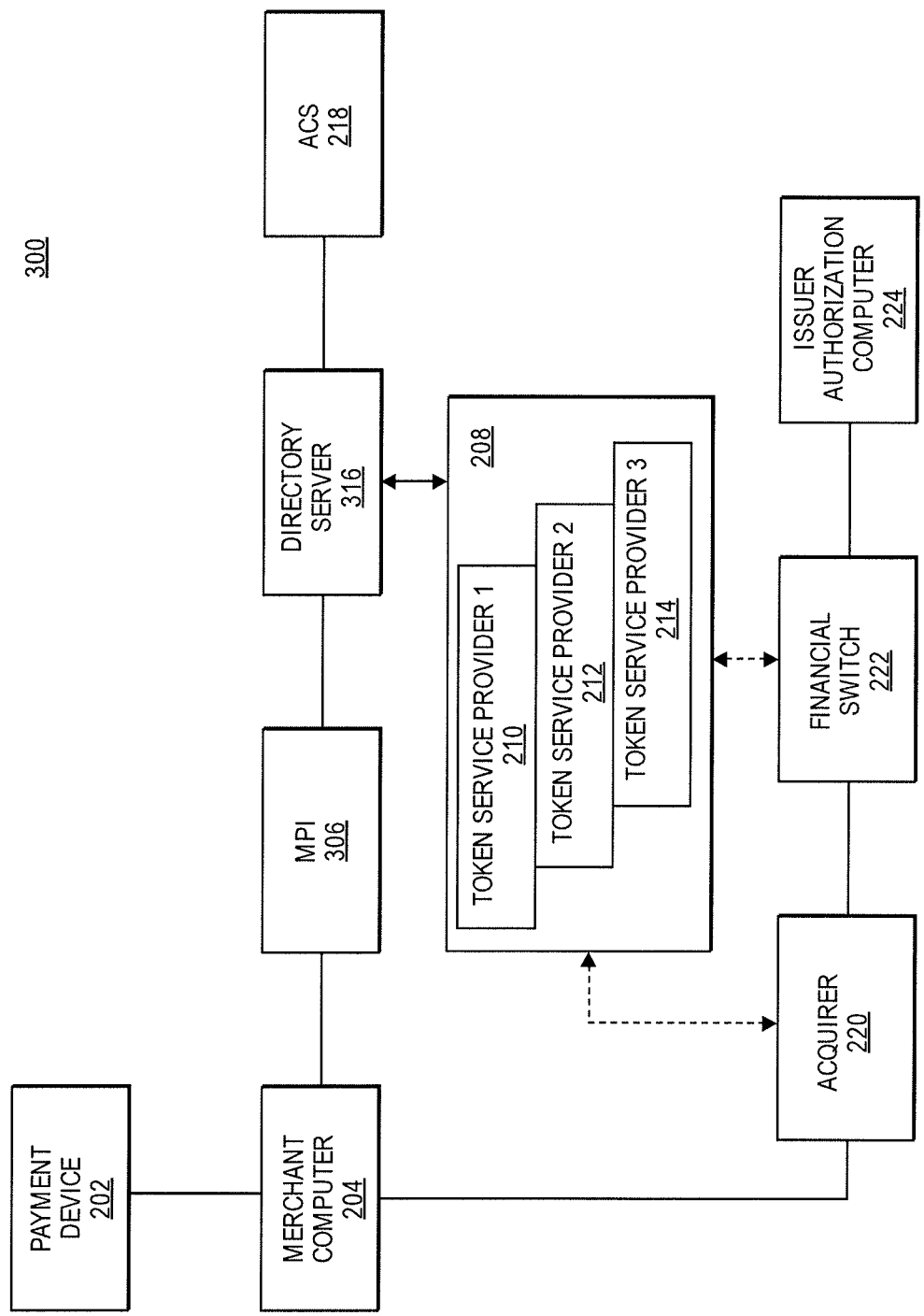
FIG. 2A shows a block diagram of a system resolving tokens in an authentication request message by a directory server prior to performing authentication according to an embodiment of the invention.

FIG. 2A includes components that are similar to those illustrated in FIG. 1A. The description of these components is provided above and will be omitted here. The system 300 illustrated in FIG. 2A differs from the system 200 illustrated in FIG. 1A to have the directory server 316 communicate with the tokenization environment 208 instead of the merchant plug-in module 306.

The merchant plug-in (MPI) module 306 illustrated in FIG. 2A may be a proxy between the merchant computer 204 and the issuer access control server 218 or other components within the system 300 (e.g. the directory server 316). The merchant plug-in module 306 may forward the authentication request message received from the merchant computer 204 to the directory server 316.

The directory server 316 may be in communication with a tokenization environment 208 including a plurality of token service providers, such as a first token service provider 210, a second token service provider 212 and a third token service provider 214. When the directory server 316 determines that the authentication request message generated by the merchant computer 204 (and received from the merchant plug-in module 306) includes a token, the directory server 316 may identify the token service provider among the plurality of token service providers as the issuer/manager of the token. The directory server 316 may interact with the identified token service provider to detokenize the token, i.e. to retrieve the account number corresponding to the token. The directory server 316 may then modify the authentication request message generated by the merchant computer 204 to replace the token with the retrieved account number. The directory server 316 may forward the modified authentication request message to the access control server 218 for authentication.

The directory server 316 may be a server computer configured to route messages from the merchant plug-in module 306 to the issuer access control server computer 218, as well as messages back from the issuer access control server 218 to the merchant plug-in module 306. In other embodiments, the directory server 316 may route authentication request and response messages between the merchant computer 204 and the issuer access control server 218 as part of a transaction. In some embodiments, the directory server computer 316 may be operated by a payment processing network.

The issuer access control server 218 may perform an authentication process, such as one discussed above in connection with FIG. 1A. The access control server 218 may then generate an authentication response message and send the authentication response message to the directory server 316. The authentication response message may include the account number retrieved by the directory server 316 from the identified token service provider. Before forwarding the authentication response message to the merchant plug-in module 306, the directory server 316 may communicate with the identified token service provider to re-tokenize the account number, i.e. the directory server 316 may send the account number to the token service provider and obtain the token corresponding to the account number. In some embodiments, the directory server 316 may store the token and/or the mapping between the token and the credentials. In such embodiments, the directory server 316 may re-tokenize the credentials without communicating with the token service provider. The directory server 316 may then modify the authentication response message to replace the account number with the token. The modified authentication response message may include, at least, the token and the authentication value.

If the authentication response message indicates that the consumer has been authenticated by the issuer's access control server 218, the merchant computer 204 may start the transaction by generating a transaction request message, as discussed above in connection with FIG. 1A.

According to various embodiments, the directory server 316 and the financial switch 222 may be the same entity or may be managed by the same entity, such as a payment processing network. In some embodiments, the issuer's access server computer 218 and the issuer authorization computer 224 may be same device or may be part of a same cluster of computers.

Figure 2B:
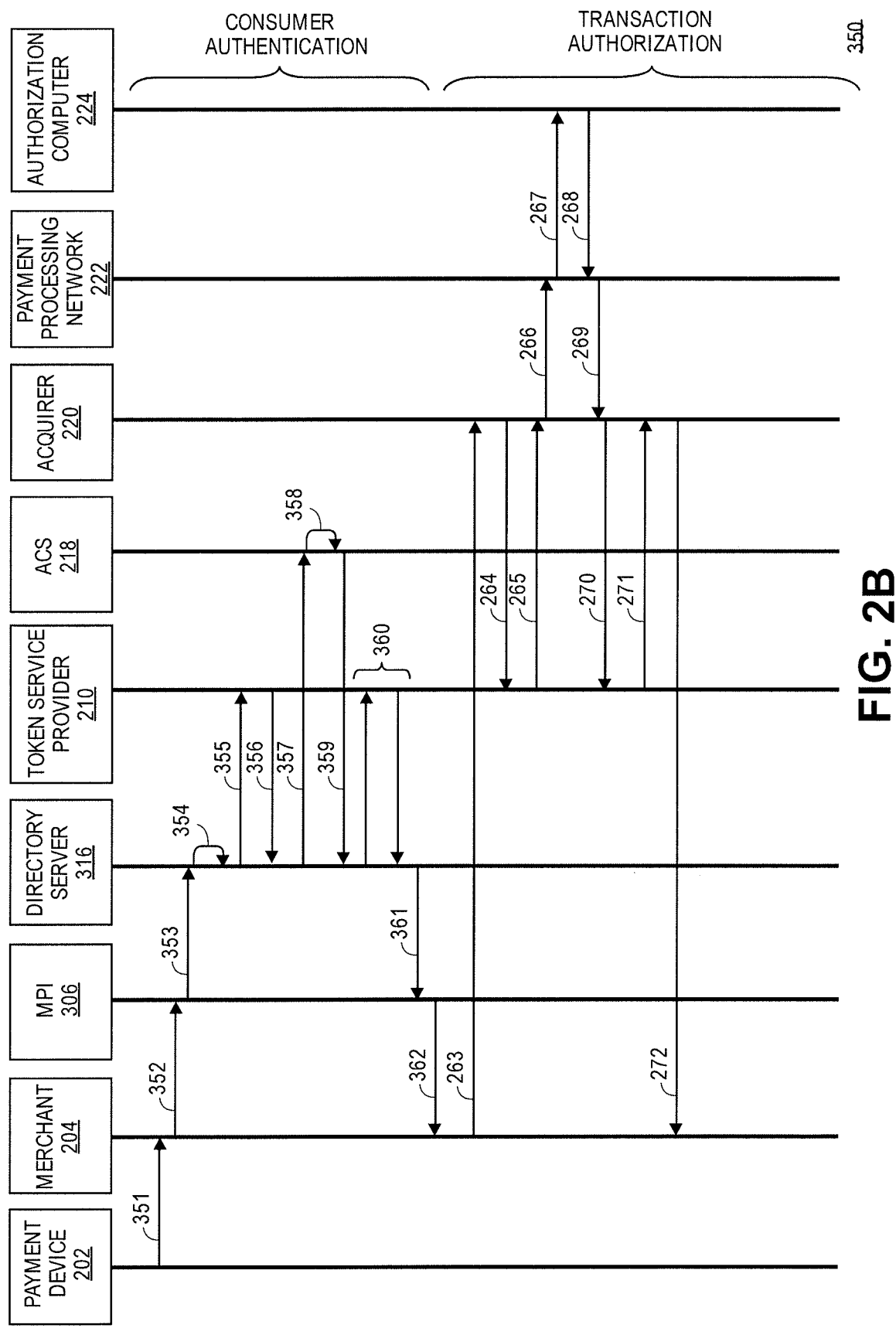
FIG. 2B shows a flowchart of steps for resolving tokens in an authentication request message by a directory server prior to performing authentication according to an embodiment of the invention.

FIG. 2B shows a flowchart of steps for resolving tokens in an authentication request message by a directory server prior to performing authentication according to an embodiment of the invention. Additional methods and processes may be included within these methods and may be recognized by one of ordinary skill in the art, in light of the description below. Further, in some embodiments of the present invention, the described methods may be combined, mixed, and matched, as one of ordinary skill would recognize.

FIG. 2B includes steps that are similar to those illustrated in FIG. 1B. The description of these steps is provided above and will be omitted here. The flowchart 350 illustrated in FIG. 2B differs from the flowchart 250 illustrated in FIG. 1B to have the directory server 316 communicate with the tokenization environment 208 instead of the merchant plug-in module 306.

At step 351, the consumer provides data, such as transaction data, identification data, payment data, etc. to the merchant device 204 using the user device 202. The data may include a token representing an account number issued to the consumer by an issuer of consumer's payment account. The merchant computer 204 may generate an authentication request message to be forwarded to an issuer access control server 218 in order to authenticate that the consumer is the rightful owner or assignee of a payment account associated with the data transmitted by the consumer. At step 352, the merchant computer 204 may send the authentication request message including at least the token to a merchant plug-in module 306.

At step 353, the merchant plug-in module 306 forwards the authentication request message to the directory server 316. At step 354, the directory server 316 may analyze the authentication request message and determine that the message includes a token. For example, the directory server 316 may parse the authentication request message and determine that data provided in a first field, such as the account data field, has a special format. According to various embodiments, the token may have a format that conforms to an industry standard. For example, the token may start, end or contain one or more specific characters. In some embodiments, the token may consist of truncated account number (e.g. first 6 digits and last 4 digits of the account number are retained) with alphabetic and numeric characters replacing middle digits.

Upon determining that the authentication request message includes a token, the directory server 316 may determine a token service provider 210 among the plurality of token service providers as the issuer and/or manager of the token. For example, the directory server 316 may determine the token service provider 210 based on a format of the token. The format of the token may include a series of predetermined characters that are assigned to a specific token service provider. The directory server 316 may have access to a table or database storing the correspondence between the token service providers and predetermined format used by the token service providers. The directory server 316 may interact with the identified token service provider 210 to de-tokenize the token in the authentication request message. In some embodiments, the directory server 316 may store the token.

At step 355, the directory server 316 may send the token to the token service provider 210. The token service provider 210 may interact with a token vault where tokens and corresponding account numbers are stored. For example, the tokens and corresponding account numbers may be stored in forms of tables or in databases. The token service provider 210 may query the token vault (e.g. the tables or the databases) and retrieve the account number (e.g. a primary account number (PAN)) corresponding to the token. At step 356, the token service provider 210 may send the account number represented by the token to directory server 316. The directory server 316 may modify the authentication request message to replace the token with the corresponding account number.

At step 357, the directory server 316 may identify the issuer access control server 218 based on the account number and send the modified authentication request message including at least the account number to the issuer access control server 218 for authentication. For example, based on the format of the account number received from the token service provider 210, the directory server 316 may query a table or a database to identify the issuer access control server for the issuer that may have generated and/or manage the account number.

In some embodiments, the consumer data provided to the merchant at step 251 may include the account number instead of the token. In such embodiments, the merchant computer 204 may generate the authentication request message including at least the account number. The authentication request message may be sent to the access control server 218 via the directory server 316 for authentication without interacting with the token service provider 210.

At step 358, the issuer access control server may perform authentication using the data in the modified authentication request message to determine whether the user is the rightful owner or assignee of the indicated account number. In some embodiments, the issuer access control server 218 may interact with the consumer so that the consumer may authenticate his or her identity by presenting authentication information to the access control server 218. In some embodiments, the consumer authenticates his or her identity by providing a password, credential, or other identifying information previously associated with their account. Upon authenticating the consumer, the access control server 218 generates an authentication response message including at least the account number and an authentication value indicating whether the consumer has been authenticated by the access server computer 218. If the authentication information provided by the consumer matches the authentication information previously associated with the account being used for the proposed transaction, then the authentication response message may include data indicating that the authentication process was successful. Alternatively, the authentication response message can include data indicating that the authentication process failed. In some embodiments, the authentication response message may include an error code identifying the reason for failure of the authentication process.

At step 359, the access control server 218 sends the authentication response message including the account number and the authentication value to the directory server 316. The directory server 316 may re-tokenize the account number included in the authentication response message by interacting with the token service provider 210. In some embodiments, the directory server 316 may store the token and/or the mapping between the token and the credentials. In such embodiments, the directory server 316 may re-tokenize the credentials without communicating with the token service provider. At step 360, the directory server 316 may send the account number to the token service provider 210 and receive the corresponding token from the token service provider 210. The directory server 316 may modify the authentication response message to replace the account number with the retrieved token. At step 361, the directory server 316 may send the modified authentication response message including at least the token and the authentication value to the merchant plug-in module 306. The merchant plug-in module 306 may forward the modified authentication response message to the merchant computer 204 at step 362.

If the consumer has been authenticated by the access control server 218 (i.e. the authentication value included in the authentication response message indicates that the consumer has been authenticated by the access control server), the merchant computer 204 may start the payment transaction by generating a transaction authorization request message including at least the authentication value and the token. The transaction authorization request message may also include the transaction amount, user identifying information, merchant identifying information, etc. Steps 263-272 directed to transaction authorization process illustrated in FIG. 2B are similar to those illustrated in FIG. 1B and hence, the discussion of steps 263-272 is omitted here.

The system and the flowchart discussed above in connection with FIGS. 2A-2B allow resolving tokens provided by the consumer prior to performing a consumer authentication. The directory server illustrated in FIGS. 3A-3B performs consumer authentication and tokenization functions in a combined manner. By having the directory server perform the consumer authentication, no changes are required on the merchant, acquirer or issuer systems. The directory server is capable of determining if the authentication request message received from the merchant computer includes a token. If the authentication request message includes a token, the directory server identifies a token provider associated with the token and interacts with the identified token provider to detokenize the token (e.g. receive an account number associated with the token). Upon communicating with an access control server to authenticate the consumer, the directory server may re-tokenize the account number when the authentication is complete.

A tokenization and/or detokenization capable directory server may be desirable as the directory server can work with multiple (e.g. all) issuers in communication with the payment network associated with the directory server. Moreover, since the directory server receives additional data going through the transaction ecosystem, the directory server may be better suited at detokenizing the tokens. For example, the directory server may recognize that the transaction started using a token. Accordingly, the directory server may assign a risk score (e.g. a favorable score if the transaction uses a token instead of an account number) to the transaction. Placing the detokenization intelligence on the directory server requires minor changes to the transaction ecosystem.

The directory server may not be the only component in the system that is capable of interacting with token service providers. For example, a token router provided in proximity of the access control server may interact with a tokenization environment including a plurality of token service providers, as illustrated in FIG. 3A.

Figure 3A:
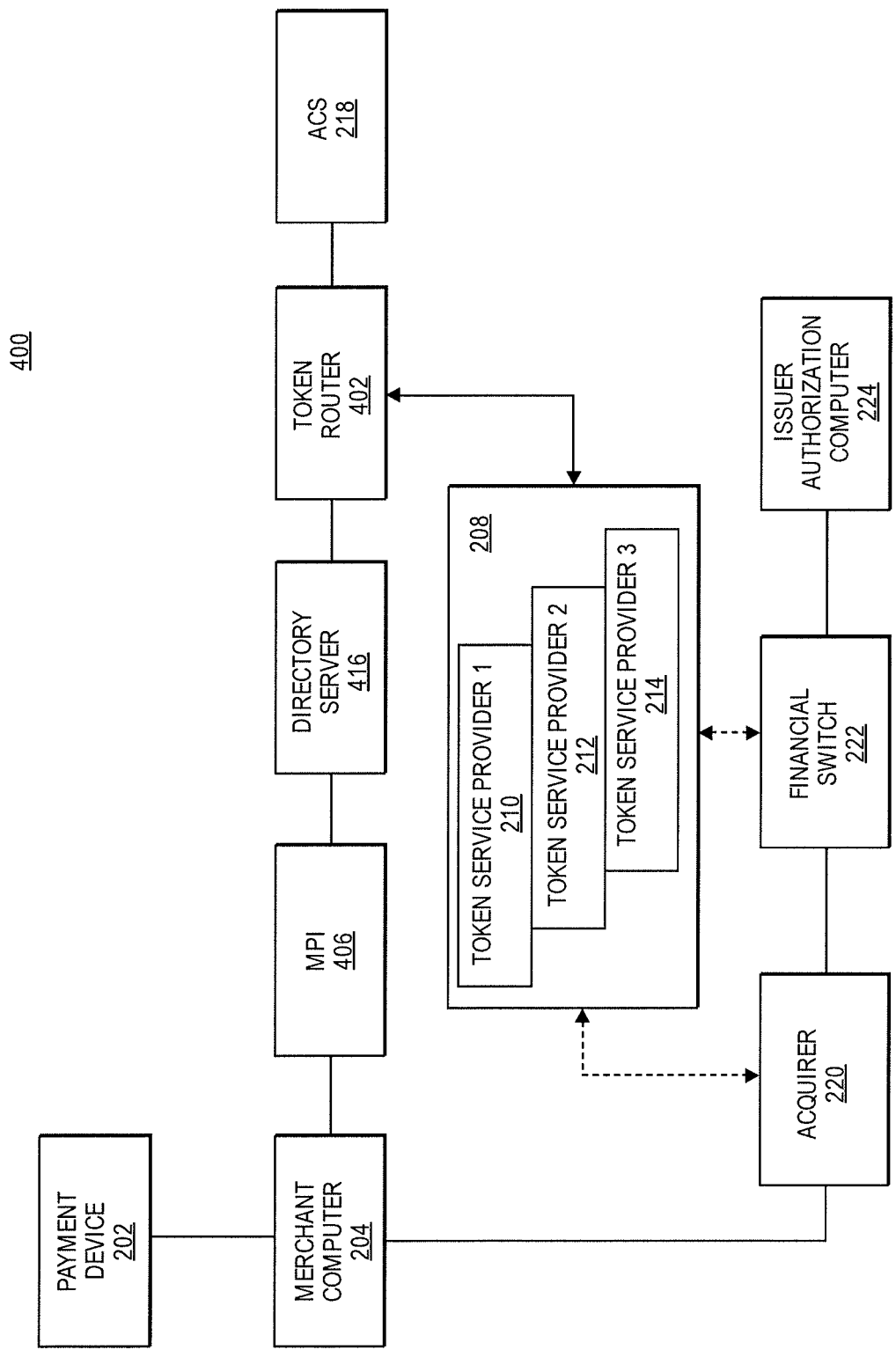
FIG. 3A shows a block diagram of a system resolving tokens in an authentication request message by a token router coupled to an access control server prior to performing authentication according to an embodiment of the invention.

FIG. 3A includes components that are similar to those illustrated in FIGS. 1A and 3A. The description of these components is provided above and will be omitted here. The system 400 illustrated in FIG. 3A differs from the system 200 illustrated in FIG. 1A to have a token router 402 communicate with the tokenization environment 208 instead of the merchant plug-in module 406. Similarly, the system 400 illustrated in FIG. 3A differs from the system 300 illustrated in FIG. 2A to have a token router 402 communicate with the tokenization environment 208 instead of the directory server 316.

The merchant plug-in (MPI) module 406 illustrated in FIG. 3A may be a proxy between the merchant computer 204 and the issuer access control server 218 or other components within the system 400 (e.g. the directory server 416). The merchant plug-in module 406 may forward the authentication request message received from the merchant computer 204 to the directory server 416.

The directory server 416 may be a server computer configured to route messages from the merchant plug-in module 406 to the issuer access control server computer 218, as well as messages back from the issuer access control server 218 to the merchant plug-in module 406. In other embodiments, the directory server 416 may route authentication request and response messages between the merchant computer 204 and the issuer access control server 218 as part of a transaction. In some embodiments, the directory server computer 416 may be operated by a payment processing network.

The system 400 illustrated in FIG. 3A may include a token router module 402 in communication with the access control server 218. For example, the token router module 402 may be provided between the directory server 416 and the access control server 218 for passing messages therebetween. In some embodiments, the token router module 402 may be integrated with the issuer access control server 218. The token router module 402 may be in communication with a tokenization environment 208 including a plurality of token service providers, such as a first token service provider 210, a second token service provider 212 and a third token service provider 214.

When the token router module 402 determines that the authentication request message generated by the merchant computer 204 (and received from the directory server 416) includes a token, the token router module 402 may identify the token service provider among the plurality of token service providers as the issuer/manager of the token. The token router module 402 may identify the relevant token server provider based on rules that may have been configured by the issuer. The rules may be based on, for example, bank identification number (BIN) range, payment card brand, etc. The token router module 402 may interact with the identified token service provider to detokenize the token, i.e. to retrieve the account number corresponding to the token. The token router module 402 may then modify the authentication request message generated by the merchant computer 204 to replace the token with the retrieved account number. The token router module 402 may forward the modified authentication request message to the access control server 218 for authentication.

The issuer access control server 218 may perform an authentication process, such as one discussed above in connection with FIG. 1A. The access control server 218 may then generate an authentication response message and send the authentication response message to the directory server 416 via the token router module 402. The authentication response message may include the account number retrieved by the token router module 402 from the identified token service provider. Before forwarding the authentication response message to the directory server 416, the token router module 402 may communicate with the identified token service provider to re-tokenize the account number, i.e. the token router module 402 may send the account number to the token service provider and obtain the token corresponding to the account number. In some embodiments, the token router module 402 may store the token and/or the mapping between the token and the credentials. In such embodiments, the token router module 402 may re-tokenize the credentials without communicating with the token service provider. The token router module 402 may then modify the authentication response message to replace the account number with the token. The modified authentication response message may include, at least, the token and the authentication value. The modified authentication response message may be sent to the merchant computer 204 via the directory server 416 and the merchant plug-in module 406.

If the authentication response message indicates that the consumer has been authenticated by the issuer's access control server 218, the merchant computer 204 may start the transaction by generating a transaction request message, as discussed above in connection with FIG. 1A.

According to various embodiments, the directory server 416 and the financial switch 222 may be the same entity or may be managed by the same entity, such as a payment processing network. In some embodiments, the issuer's access server computer 218, the token router module 402 and the issuer authorization computer 224 may be same device or may be part of a same cluster of computers.

Figure 3B:
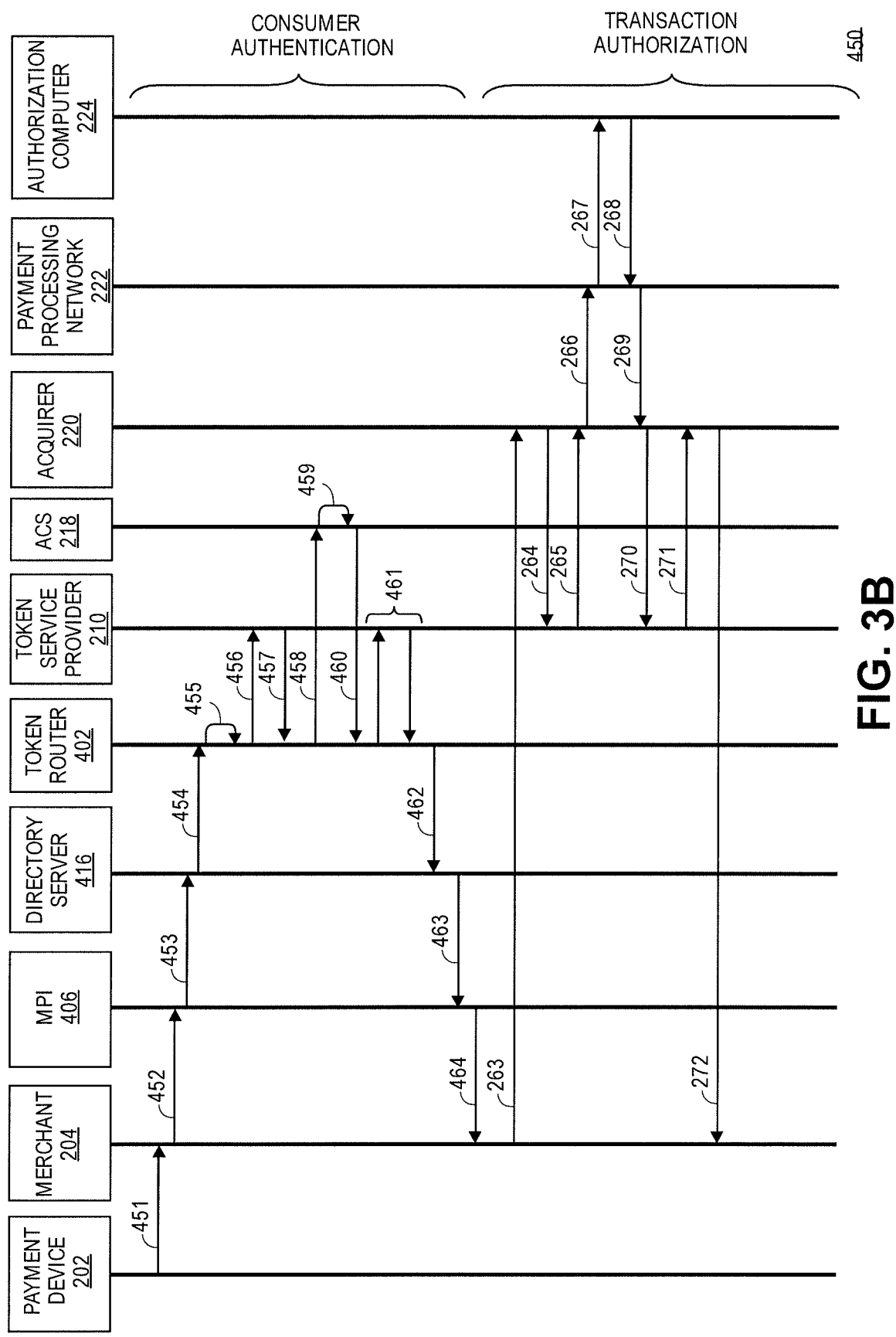
FIG. 3B shows a flowchart of steps for resolving tokens in an authentication request message by a token router coupled to an access control server prior to performing authentication according to an embodiment of the invention.

FIG. 3B shows a flowchart of steps for resolving tokens in an authentication request message by a token router module prior to performing authentication according to an embodiment of the invention. Additional methods and processes may be included within these methods and may be recognized by one of ordinary skill in the art, in light of the description below. Further, in some embodiments of the present invention, the described methods may be combined, mixed, and matched, as one of ordinary skill would recognize.

FIG. 3B includes steps that are similar to those illustrated in FIG. 1B. The description of these steps is provided above and will be omitted here. The flowchart 450 illustrated in FIG. 3B differs from the flowchart 250 illustrated in FIG. 1B to have the token router module 402 communicate with the tokenization environment 208 instead of the merchant plug-in module 406.

At step 451, the consumer provides data, such as transaction data, identification data, payment data, etc. to the merchant device 204 using the user device 202. The data may include a token representing an account number issued to the consumer by an issuer of consumer's payment account. The merchant computer 204 may generate an authentication request message to be forwarded to an issuer access control server 218 in order to authenticate that the consumer is the rightful owner or assignee of a payment account associated with the data transmitted by the consumer. At step 452, the merchant computer 204 may send the authentication request message including at least the token to a merchant plug-in module 406.

At step 453, the merchant plug-in module 406 forwards the authentication request message to the directory server 416. At step 454, the directory server 416 forwards the authentication request message to the token router module 402. In some embodiments, the directory server 416 may forward the authentication request message to the access control server 218 and the message may be intercepted by the token router module 402.

At step 455, the token router module 402 may analyze the authentication request message and determine that the message includes a token. For example, the token router module 402 may parse the authentication request message and determine that data provided in a first field, such as the account data field, has a special format. According to various embodiments, the token may have a format that conforms to an industry standard. For example, the token may start, end or contain one or more specific characters. In some embodiments, the token may consist of truncated account number (e.g. first 6 digits and last 4 digits of the account number are retained) with alphabetic and numeric characters replacing middle digits.

Upon determining that the authentication request message includes a token, the token router module 402 may determine a token service provider 210 among the plurality of token service providers as the issuer and/or manager of the token. For example, the token router module 402 may determine the token service provider 210 based on a format of the token. The format of the token may include a series of predetermined characters that are assigned to a specific token service provider. The token router module 402 may have access to a table or database storing the correspondence between the token service providers and predetermined format used by the token service providers. In other embodiments, the token router module 402 may determine the token service provider 210 based on one or more rules configured by the issuer. The token router module 402 may interact with the identified token service provider 210 to de-tokenize the token in the authentication request message. In some embodiments, the token router module 402 may store the token.

At step 456, the token router module 402 may send the token to the token service provider 210. The token service provider 210 may interact with a token vault where tokens and corresponding account numbers are stored. At step 457, the token service provider 210 may send an account number (e.g. a primary account number (PAN)) represented by the token to the token router module 402. The token router module 402 may modify the authentication request message to replace the token with the corresponding account number.

At step 458, the token router module 402 sends the modified authentication request message including at least the account number to the issuer access control server 218 for authentication.

At step 459, the issuer access control server 218 may perform authentication using the data in the modified authentication request message to determine whether the user is the rightful owner or assignee of the indicated account number. In some embodiments, the issuer access control server 218 may interact with the consumer so that the consumer may authenticate his or her identity by presenting authentication information to the access control server 218. In some embodiments, the consumer authenticates his or her identity by providing a password, credential, or other identifying information previously associated with their account. Upon authenticating the consumer, the access control server 218 generates an authentication response message including at least the account number and an authentication value indicating whether the consumer has been authenticated by the access server computer 218. If the authentication information provided by the consumer matches the authentication information previously associated with the account being used for the proposed transaction, then the authentication response message may include data indicating that the authentication process was successful. Alternatively, the authentication response message can include data indicating that the authentication process failed. In some embodiments, the authentication response message may include an error code identifying the reason for failure of the authentication process.

At step 460, the access control server 218 sends the authentication response message including the account number and the authentication value to the token router module 402. The token router module 402 may re-tokenize the account number included in the authentication response message by interacting with the token service provider 210. In some embodiments, the token router module 402 may store the token and/or the mapping between the token and the credentials. In such embodiments, the token router module 402 may re-tokenize the credentials without communicating with the token service provider. At step 461, the token router module 402 may send the account number to the token service provider 210 and receive the corresponding token from the token service provider 210. The token router module 402 may modify the authentication response message to replace the account number with the retrieved token. At step 462, the token router module 402 may send the modified authentication response message including at least the token and the authentication value to the directory server 416. At step 463, the directory server 416 may forward the modified authentication response message to the merchant plug-in module 406. The merchant plug-in module 406 may forward the modified authentication response message to the merchant computer 204 at step 464.

If the consumer has been authenticated by the access control server 218 (i.e. the authentication value included in the authentication response message indicates that the consumer has been authenticated by the access control server), the merchant computer 204 may start the payment transaction by generating a transaction authorization request message including at least the authentication value and the token. The transaction authorization request message may also include the transaction amount, user identifying information, merchant identifying information, etc. Steps 263-272 directed to transaction authorization process illustrated in FIG. 3B are similar to those illustrated in FIG. 1B and hence, the discussion of steps 263-272 is omitted here.

A tokenization and/or detokenization capable token router module may be desirable as it confines related changes to the payment ecosystem to the access control server, or the issuer. In addition, placing the detokenization intelligence at the token router allows issuers to better control the transaction flow.

Embodiments discussed herein allow for resolving the tokens provided in authentication request messages prior to performing authentication. When merchants or wallet providers send tokenized authentication request messages to the issuers it desirable to resolve the token to the corresponding account number before the authentication request reaches the issuer. Embodiments allow for a merchant plug-in module, a directory server or a token router provided in a transaction system to interact with a plurality of token service providers to detokenize and/or re-tokenize the data provided in the authentication messages.

The various participants and elements described herein may operate one or more computer apparatuses to facilitate the functions described herein. Any of the elements in the above-described FIGS. 1A-3B including any servers or databases, may use any suitable number of subsystems to facilitate the functions described herein.

Figure 4:
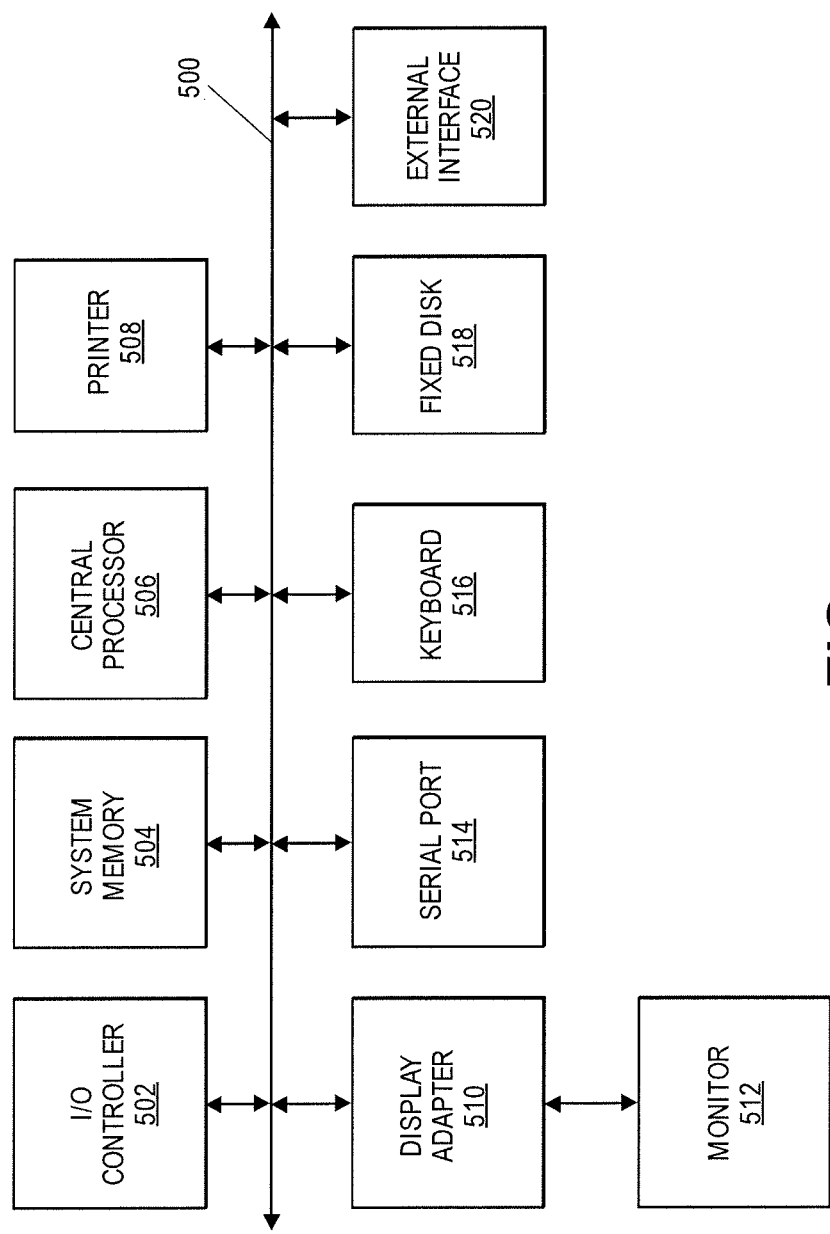
FIG. 4 shows an exemplary block diagram of a computer system.

Examples of such subsystems or components are shown in FIG. 4. The subsystems shown in FIG. 4 are interconnected via a system bus 500. Additional subsystems such as a printer 508, keyboard 516, fixed disk 518 (or other memory comprising computer readable media), monitor 512, which is coupled to display adapter 510, and others are shown. Peripherals and input/output (I/O) devices, which couple to I/O controller 502 (which can be a processor or other suitable controller), can be connected to the computer system by any number of means known in the art, such as serial port 514. For example, serial port 514 or external interface 520 can be used to connect the computer apparatus to a wide area network such as the Internet, a mouse input device, or a scanner. The interconnection via system bus allows the central processor 506 to communicate with each subsystem and to control the execution of instructions from system memory 504 or the fixed disk 518, as well as the exchange of information between subsystems. The system memory 504 and/or the fixed disk 518 may embody a non-transitory computer-readable storage medium. The non-transitory computer-readable storage medium may store instructions that, when executed by the one or more processors 506, cause the computer system to implement the methods and flows described herein.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of data such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired data and which can be accessed by the computer. Based on the disclosure and teachings provided herein, a person of ordinary skill in the art will appreciate other ways and/or methods to implement the various embodiments.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents. It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software. Any of the software components or functions described in this application, may be implemented as software code to be executed by a processor using any suitable computer language such as, for example, Java, C, C++, Python or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Although many embodiments were described above as comprising different features and/or combination of features, a person of ordinary skill in the art after reading this disclosure may understand that in some instances, one or more of these components could be combined with any of the components or features described above. That is, one or more features from any embodiment can be combined with one or more features of any other embodiment without departing from the scope of the invention.

A recitation of "a", "an" or "the" is intended to mean "one or more" unless specifically indicated to the contrary. Reference to a "first" component does not necessarily require that a second component be provided. Moreover reference to a "first" or a "second" component does not limit the referenced component to a particular location unless expressly stated.

What is claimed is:

1. A method comprising:
   receiving, by a first server computer, transaction data associated with a tokenized transaction initiated by a user;
   determining, by the first server computer, that the transaction data includes a token, wherein the token comprises tokenized credentials;
   initiating, by the first server computer, a user authentication process in connection with the tokenized transaction prior to a transaction authorization process in connection with the tokenized transaction, wherein the user authentication process includes:
      identifying, by the first server computer, a token service provider among a plurality of token service providers;
      sending, by the first server computer, the token to the token service provider to detokenize the token comprising the tokenized credentials to form detokenized credentials;
      receiving, by the first server computer, from the token service provider, the detokenized credentials;
      forwarding, by the first server computer, the detokenized credentials to a second server computer for authentication; and
      receiving, by the first server computer, the detokenized credentials and an authentication value from the second server computer upon the second server computer authenticating the detokenized credentials before the transaction authorization process starts,
   wherein the authentication value and the token are incorporated into a transaction authorization request message after the transaction authorization process in connection with the tokenized transaction starts, and
   wherein the transaction authorization request message associated with the tokenized transaction includes at least the token and the authentication value.

2. The method of claim 1, further comprising:
   sending, by the first server computer, the detokenized credentials to the token service provider after receiving the detokenized credentials and the authentication value to re-tokenize the detokenized credentials; and
   receiving, by the first server computer, the token associated with re-tokenized credentials from the token service provider.

3. The method of claim 2, the method further comprising:
   sending, by the first server computer, the token and the authentication value to a third server computer for initiating the transaction authorization process using the token and the authentication value, wherein the first server computer is a directory server computer or a token router computer, wherein the third server computer is a merchant computer, and wherein the tokenized transaction is between the user and a merchant associated with the merchant computer.

4. The method of claim 1, wherein the token in the transaction authorization request message is de-tokenized using the token service provider and sent to an authorization computer as part of the transaction authorization process.

5. The method of claim 1, wherein the detokenized credentials include a unique primary account number.

6. The method of claim 1, wherein the token service provider is identified among the plurality of token service providers based on a format of the token or based on one or more predetermined rules.

7. A server computer comprising:
a processor and a computer readable medium coupled to the processor, the computer readable medium comprising instructions that, when executed by the processor, cause the processor to:
receive transaction data associated with a tokenized transaction initiated by a user;
determine that the transaction data includes a token, wherein the token comprises tokenized credentials;
initiate a user authentication process in connection with the tokenized transaction prior to a transaction authorization process in connection with the tokenized transaction, wherein the user authentication process includes:
identifying a token service provider among a plurality of token service providers;
sending the token to the token service provider to detokenize the token comprising the tokenized credentials to form detokenized credentials;
receiving from the token service provider the detokenized credentials;
forwarding the detokenized credentials to a second server computer for authentication; and
receiving the detokenized credentials and an authentication value from the second server computer upon the second server computer authenticating the detokenized credentials before the transaction authorization process starts,
wherein the authentication value and the token are incorporated into a transaction authorization request message after the transaction authorization process in connection with the tokenized transaction starts, and
wherein the transaction authorization request message associated with the tokenized transaction includes at least the token and the authentication value.

8. The server computer of claim 7, wherein the computer readable medium further comprises instructions that, when executed by the processor, cause the processor to:
send the detokenized credentials to the token service provider after receiving the detokenized credentials and the authentication value to re-tokenize the detokenized credentials; and
receive the token associated with re-tokenized credentials from the token service provider.

9. The server computer of claim 8, wherein the computer readable medium further comprises instructions that, when executed by the processor, cause the processor to:
send the token and the authentication value to a third server computer for initiating the transaction authorization process using the token and the authentication value, wherein the server computer is a directory server computer or a token router computer, wherein the third server computer is a merchant computer, wherein the tokenized transaction is between the user and a merchant associated with the merchant computer.

10. The server computer of claim 7, wherein the detokenized credentials include a unique primary account number.

11. The server computer of claim 7, wherein the token service provider is identified among the plurality of token service providers based on a format of the token or based on one or more predetermined rules.

12. A system comprising:
a first server computer including a first processor and a first computer readable medium coupled to the first processor, the first computer readable medium comprising instructions that, when executed by the first processor, cause the first processor to:
receive transaction data associated with a tokenized transaction initiated by a user;
determine that the transaction data includes a token, wherein the token comprises tokenized credentials;
initiate a user authentication process in connection with the tokenized transaction prior to a transaction authorization process in connection with the tokenized transaction, wherein the user authentication process includes:
identifying a token service provider among a plurality of token service providers;
sending the token to the token service provider to detokenize the token comprising the tokenized credentials to form detokenized credentials; and
receiving from the token service provider the detokenized credentials; and
a second server computer including a second processor and a second computer readable medium coupled to the second processor, the second computer readable medium comprising instructions that, when executed by the second processor, cause the second processor to:
receive the detokenized credentials directly or indirectly from the first server computer for authentication;
authenticate the detokenized credentials;
generate an authentication value upon authenticating the detokenized credentials; and
send the detokenized credentials and the authentication value to the first server computer before the transaction authorization process starts,
wherein the token and the authentication value are incorporated into a transaction authorization request message after the transaction authorization process in connection with the tokenized transaction starts, and
wherein the transaction authorization request message associated with the tokenized transaction includes at least the token and the authentication value.

13. The system of claim 12, wherein the first computer readable medium further comprises instructions that, when executed by the first processor, cause the first processor to:
send the detokenized credentials to the token service provider after receiving the detokenized credentials and the authentication value to re-tokenize the detokenized credentials;
receive the token associated with re-tokenized credentials from the token service provider; and
send the token and the authentication value in the transaction authorization request message to a third server computer for initiating the transaction authorization process using the token and the authentication value, wherein the first server computer is a directory server computer or a token router computer, wherein the third server computer is a merchant computer, wherein the tokenized transaction is between the user and a merchant associated with the merchant computer.

14. The system of claim 12, wherein the token service provider is identified among the plurality of token service providers based on a format of the token or based on one or more predetermined rules.

15. A method comprising:
receiving, by a first server computer, transaction data associated with a tokenized transaction initiated by a user;
determining, by the first server computer, that the transaction data includes a token wherein the token comprises tokenized credentials;
initiating, by the first server computer, a user authentication process in connection with the tokenized transaction prior to a transaction authorization process in connection with the tokenized transaction, wherein the user authentication process includes:
identifying, by the first server computer, a token service provider among a plurality of token service providers;
sending, by the first server computer, the token to the token service provider to detokenize the tokenized credentials to form detokenized credentials; and
receiving, by the first server computer, the detokenized credentials that were replaced with the token from the token service provider;
receiving, by a second server computer, the detokenized credentials directly or indirectly from the first server computer for authentication;
authenticating, by the second server computer, the detokenized credentials;
generating, by the second server computer, an authentication value upon authenticating the detokenized credentials; and
sending, by the second server computer, the detokenized credentials and the authentication value to the first server computer before the transaction authorization process starts,
wherein the token and the authentication value are incorporated into a transaction authorization request message after the transaction authorization process in connection with the tokenized transaction starts, and
wherein the transaction authorization request message associated with the tokenized transaction includes at least the token and the authentication value.

16. The method of claim 15, further comprising:
sending, by the first server computer, the detokenized credentials to the token service provider after receiving the detokenized credentials and the authentication value to re-tokenize the detokenized credentials;
receiving, by the first server computer, the token associated with re-tokenized credentials from the token service provider; and
sending, by the first server computer, the token and the authentication value in the transaction authorization request message to a third server computer for the transaction authorization process using the token and the authentication value, wherein the first server computer is a directory server computer or a token router computer, wherein the third server computer is a merchant computer, wherein the tokenized transaction is between the user and a merchant associated with the merchant computer.

17. The method of claim 16, wherein the token in the transaction authorization request message is de-tokenized using the token service provider and sent to an authorization computer as part of the transaction authorization process.

18. The method of claim 15, wherein the token service provider is identified among the plurality of token service providers based on a format of the token or based on one or more predetermined rules.

* * * * *